United States Patent [19]

Lubin et al.

[11] Patent Number: 4,495,383

[45] Date of Patent: Jan. 22, 1985

[54] HANDS-FREE TELEPHONE-SPEAKER INTERFACER

[75] Inventors: David Lubin, Bradenton, Fla.; Larry W. Connor; Samuel W. Glass, both of Greensboro, N.C.

[73] Assignee: Air Conditioning Corporation, Greensboro, N.C.

[21] Appl. No.: 388,132

[22] Filed: Jun. 14, 1982

[51] Int. Cl.³ .............................................. H04M 1/60
[52] U.S. Cl. .................................................. 179/100 L
[58] Field of Search ................. 179/6.16, 81 B, 100 L

[56] References Cited

U.S. PATENT DOCUMENTS

| | | | |
|---|---|---|---|
| 3,612,766 | 10/1971 | Ferguson | 179/100 L |
| 3,743,791 | 7/1973 | Duff et al. | 179/81 B |
| 3,772,472 | 11/1973 | Blomberg | 179/100 L |
| 3,872,262 | 3/1975 | Kerman . | |
| 3,976,847 | 8/1976 | Bidlack et al. | 179/1 HF X |
| 4,063,047 | 12/1977 | Huryn | 179/1 HF X |
| 4,074,081 | 2/1978 | Humm | 179/6.16 |
| 4,158,112 | 6/1979 | Cerbone et al. | 179/1 HF X |
| 4,172,967 | 10/1979 | Porter et al. | 179/1 HF |
| 4,237,344 | 12/1980 | Moore . | |
| 4,246,443 | 1/1981 | Smith | 179/1 HF X |
| 4,379,210 | 4/1983 | Sparber . | |
| 4,387,272 | 6/1983 | Castro et al. | 179/6.16 X |

Primary Examiner—Keith E. George
Attorney, Agent, or Firm—Lane, Aitken & Kananen

[57] ABSTRACT

An apparatus for interfacing a speaker phone with a telephone network includes switch means for selectively connecting said interfacing apparatus with a telephone network to permit either conventional or automatic answering. A coupler, responsive to ringing signals on the telephone lines discharges a charging capacitor to a level sufficient to cause the automatic, hands-free interconnection of the speaker phone with the telephone line. In one embodiment, a timer is provided for limiting the length of time during which the speaker phone is coupled to the telephone line. A reset switch is provided in cooperation with the timer to permit the timing cycle to be reset upon command, thereby to shorten the time of connection if desired. The system operates in either a timed or extended mode. To bypass the timer and indefinitely extend the time during which the answered call is coupled between the telephone lines and the speaker phone, an extend switch is also provided to override the timer. In an alternative embodiment, the ringing voltage on the telephone line is optically coupled to an electromechanical circuit controlled by a photocell.

5 Claims, 4 Drawing Figures

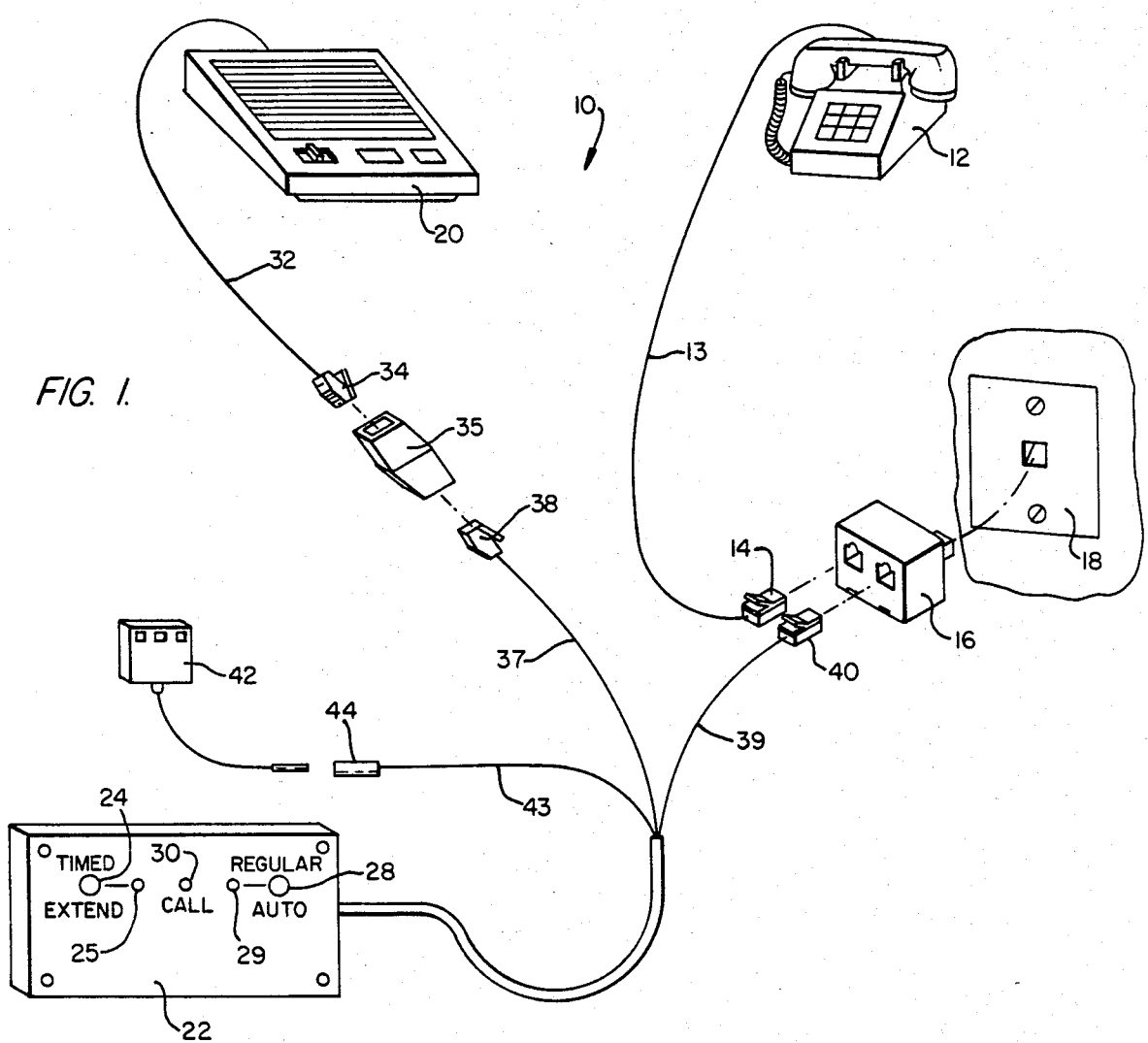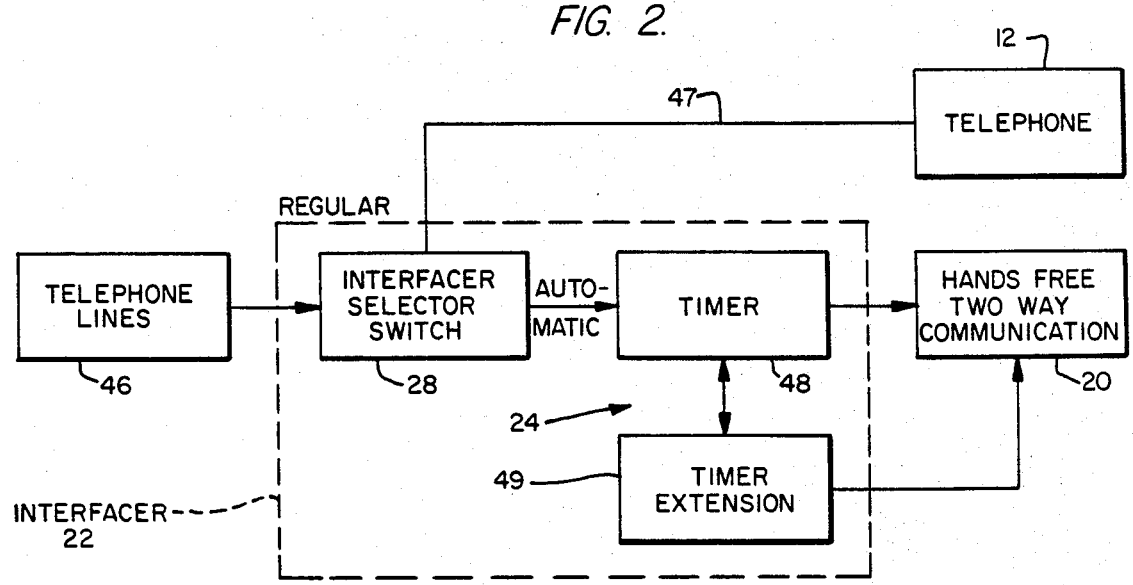

HANDS-FREE TELEPHONE-SPEAKER INTERFACER

CROSS-REFERENCE TO RELATED APPLICATION

This application contains subject matter related to subject matter disclosed in U.S. Patent application Ser. No. 388,133, filed on this date and assigned to the assignee of the instant invention. Claims directed to the embodiment of FIG. 3 are contained in one application in the names of one inventive entity, while claims directed specifically to the embodiment of FIG. 4 in the names of another inventive entity are contained in the other related application.

BACKGROUND OF THE INVENTION

This invention relates to an apparatus for interfacing a speaker phone with a telephone network to permit hands-free automatic answering and communication. More particularly, this invention relates to such an apparatus for providing an automatic answering capability for the hands-free feature to interconnect, upon actuation of a selector switch, an incoming telephone call to a speaker phone. The invention also relates to such an apparatus which includes a timer for controlling the length of time of such interconnection and a bypass switch for bypassing the timer.

It is known in the art to provide a hands-free answer capability which enables a telephone subscriber to answer an incoming call without physical manipulation of the telephone handset. Examples of such systems are shown in U.S. Pat. No. 4,172,967 which discloses a telephone system which includes an automatic answering provision with a hands-free feature, wherein the incoming call activates a speaker phone, or combination loudspeaker and microphone, and wherein termination of the call is under control of a timer. Another such system is shown in U.S. Pat. No. 4,063,047 which discloses such a telephone system with a multilink hands-free answer circuit while U.S. Pat. No. 3,743,791 discloses a voice actuated answering system.

In the main, systems of the prior art have been directed to the telephone communication side of the system and it is feature of this invention to provide a device which can be used on or in connection with a private telephone line or switchboard extension with a telephone speaker phone. Such total hands-free answering and conversational capability is particularly advantageous for the physically handicapped or for an outpatient during a period of convalescence to respond to an inquiry from trained hospital personnel using a system such as that described in U.S. Pat. No. 4,237,344. Furthermore, hands-free conversation is advantageous for persons whose activities make handling a telephone difficult or dangerous. Such individuals include those having wet or soiled hands, such as an employee of a laundry, cooks, hairdressers, automobile mechanics or those people whose tasks require the use of both hands as a part of the work task or who have limited movement in a particular area, such as a secretary, laboratory technician or the like. Thus, it is an overall objective of this invention to provide a simplified, portable, readily connectable, automatic answering service for automatically interconnecting incoming telephone calls with a speaker phone to permit two-way communication by the recipient with the use of a minimum amount of circuitry and with a simple connection. Moreover, it is an aspect of the invention to provide such a feature as a modular package capable of being moved to various telephone jack locations throughout a particular installation, thus minimizing the capital expenditure of the user while maximizing the versatility of the unit.

Still further, it is desired to provide such a system with a minimum of component parts in a way which is safe, reliable, and low in cost while high in convenience.

These and other objectives of this invention will become apparent from a review of the written description of the invention which follows, taken in conjunction with the accompanying claims and drawings.

BRIEF SUMMARY OF THE INVENTION

Directed to achieving the aforestated objects of the invention and overcoming the problems of the prior art, this invention relates to an apparatus for interfacing a two-way speaker device with a telephone network. The apparatus includes a source of power for the interfacing apparatus, such as by the use of a transformer connected to a wall outlet in a home. Selective switch means are provided for selectively connecting, when actuated, the interfacing apparatus with the telephone network to permit telephone operation in either a conventional manner or in an automatic answering mode. When in the automatic answering mode, a coupler is provided for automatically coupling the telephone network to the speaker device to receive incoming telephone calls on the speaker device when the selector switch is actuated. Two embodiments of the interfacer are disclosed.

The first embodiment of the interfacer includes an optically coupled circuit for coupling the telephone ringing circuit in a manner which discharges a charging capacitor to a predetermined signal level. Means are responsive to the discharge of the capacitor to a predetermined signal level to connect the speaker phone to the telephone lines automatically in a hands-free manner in response to the telephone ringing signal. Preferably, such an optocoupler includes a blocking capacitor at the input thereof for blocking DC components of the ringing signal from the optocoupler to permit cycling of the discharge of the charging capacitor.

A timer is connected in circuit with the output of the optocoupler for limiting the time duration during which the telephone network is coupled to the speaker phone. A reset switch is provided in cooperation with the timer for canceling the predetermined time cycle in the timer upon command. In the alternative, the timer can be bypassed by operating a selector switch so that the coupling is extended until that switch is again actuated.

In the alternative embodiment, the ringing signal is provided to a neon lamp optically coupled with a photocell having a resistance inversely proportional to the amount of light incident on the cell. As the light increases and the resistance of the photocell decreases, the current through a photocell relay increases to latch contacts to couple the speaker phone to the telephone line. A timing and extension feature as in the previous embodiment are also provided.

BRIEF DESCRIPTION OF THE DRAWINGS

In the drawings:

FIG. 1 is a pictorial illustration of the portable components of the apparatus according to the invention for providing an automatic telephone answering capability through a speaker phone for an incoming telephone call;

FIG. 2 is block diagram showing the essential components for providing the various modes of operation of the alternative embodiments;

DETAILED DESCRIPTION OF THE PREFERRED EMBODIMENT

Figure 3:
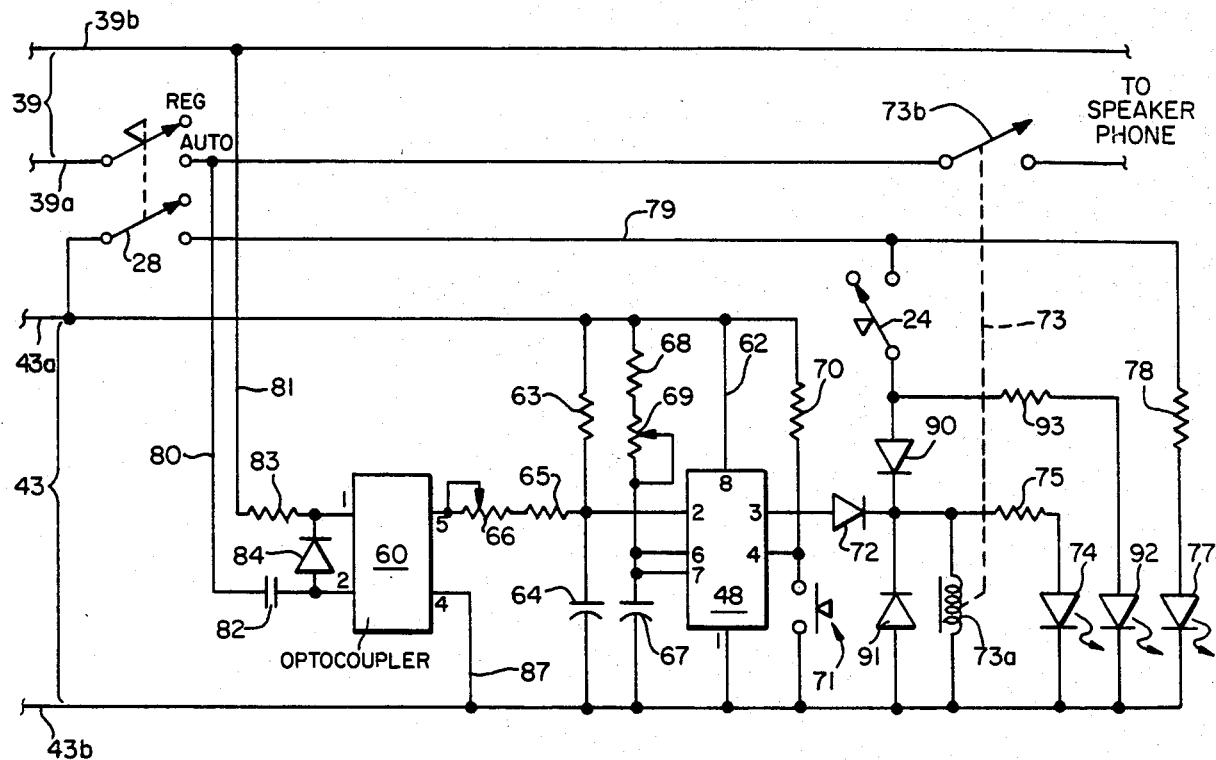
FIG. 3 is a detailed circuit and wiring diagram for the electronic embodiment of the apparatus according to the invention.

A pictorial illustration of the components of the portable hands-free telephonic interfacing system according to the invention, designated generally by the reference numeral 10, is shown in FIG. 1. The system includes a conventional telephone handset 12 connected by the telephone conductor 13 through a modular plug 14 to a modular T-adapter 16 secured to a telephone wall jack 18 in a conventional manner. The incoming telephone lines are connected to the wall jack 18 to receive and transmit telephone calls through the available telephone network. The operation of such a conventional telephone system is well known in the art.

A two-way speaker phone unit 20 is provided to permit hands-free speaking and listening communication with the telephone network when interconnected according to the invention with an interfacer device 22 according to the invention. As is well known, a two-way speaker phone includes at least a microphone, for conveying the voice signals of the call recipient, and a loudspeaker, for transmitting the voice signals of the initiating caller. The interfacer device 22 operates, when actuated, to answer an incoming call automatically and to switch the incoming call to the speaker phone unit 20 so that a two-way conversation may proceed. The interfacer device 22 includes a timing means which has the capability of turning off the speaker-phone unit at the end of an adjustable preset interval to terminate the telephone conversation. The interfacer device 22 also includes means to override the timing means to extend the call by actuating an extend switch 24 on the panel of the device 22. A light indicator 25 is also provided on the panel of the interfacer 22 to indicate the state of actuation of the extend switch, so that the user knows whether the call will be of a fixed or indeterminate length of time.

The device also includes means for switching the device into and out of circuit with the telephone line by actuating a switch 28 on the face of the panel. The switch 28, with an associated indicator 29, permits either regular operation of the telephone system or automatic operation commanding the use of the speaker phone 20 for the predetermined or extended times mentioned above. When the switch 28 is in its regular position, the incoming call is answered in a normal manner by uncradling the handset of the telephone 12.

A call indicator 30 is also provided on the panel to indicate visually the presence of an incoming call.

The speaker phone 20 is connected by a conductor 32 to a modular plug 34 (for example, a Model No. RJ 11C connector) in turn connected to a modular in-line connector 35. Similarly, the interfacer device 22 is connected by a conductor 37 to a modular plug 38 (for example, also a Model No. RJ 11C). The telephone lines are connected to the interfacer unit 22 by telephone conductors 39 connected to the telephone system through the telephone wall jack 18, the modular T-adapter 16 and the modular plug 40. Power is provided to the interfacer device 22 through a transformer 42 connected to a local source of power (not shown), which provides an output on the order of 6 to 12 volts DC, connected by a power cord 43 and a plug jack connector 44.

The modular nature of the system shown in FIG. 1 and its capability of simple connection to an existing telephone system through an available wall jack permits such systems to be temporarily installed, at a particular location, if desirable. For example, such a system can be used during a period of convalescence of an outpatient to receive on a hands-free basis incoming calls from medical personnel periodically inquiring on the status of the condition of the patient. In a business environment, as another example, the system can be quickly installed at conference or meeting sites to permit participants to receive incoming calls automatically with a minimum of interruption and permit hands-free communication. Even for permanent installation, the simple connections of FIG. 1 reduce installation cost and inconvenience, among other advantages.

FIG. 2 is a block diagram of the components of the system.

As can be understood from FIG. 2, the interfacer 22 couples the incoming telephone lines 46 and hence the incoming call to a speaker phone 20 permitting hands-free two-way communication depending on the regular or automatic position of the interfacer selector switch 28. When in the regular position, the incoming call is routed on line 47 to the telephone 12 in a conventional manner. When the switch 28 is in the automatic position, the incoming call, which is answered automatically, is either limited for a predetermined duration by a timer 48 or the timer may be bypassed so that the time of the incoming call is extended by an extension circuit 49.

A preferred embodiment of this invention is directed to an electronic system which comprises the interfacer device 22. In the related application, the device includes an electromechanical system for achieving the features of the invention.

A circuit and wiring diagram of the electronic embodiment of the interfacer device 22 is shown in FIG. 3. Where appropriate, the same reference numerals are used for like components shown in FIGS. 1 and 2. The telephone line 39 is connected to the input leads 39a and 39b, which at the output of the device are connected to the speaker phone 20. The transformer conductor 43 is connected to the leads 43a and 43b to provide power to the input of the interfacer device 22. The telephone line 39a and the transformer line 43a are connected to the input terminals of the switch 28 for commanding either regular or automatic operation, with the switch 28 shown in its regular operation position.

An optocoupler 60 has its input in circuit with the telephone lines 39a and 39b, and its output in circuit with the input of the timer circuit 48, the function of which will be described in greater detail hereinafter.

When the transformer 42 is in circuit with its input power line, such as when it is plugged in, the transformed output power is provided on lead 43a to an input at the 8-pin of the timer circuit 48 directly through lead 62 and through its associated components. Specifically, the 2-pin of the timer 48 is connected to the connection between a resistor 63 and a charging capacitor 64, which connection is also connected through a fixed resistor 65 and a variable resistor 66 to an output of the optocoupler 60. Both the 6-pin and the 7-pin of the timer 48 are connected to the connection between a capacitor 67 and series-connected fixed resistor 68 and variable timing resistor 69. The series circuit of the resistor 63 and the charging capacitor 64 is connected between the conductor 43a and the grounded lead 43b, while the series circuit of the resistor 68, variable resistor 69, and capacitor 67 is similarly connected between these same two lines. The 1-pin of the timer 61 is directly connected to the grounded lead 43b. The 4-pin output of the timer is connected to the junction between a fixed resistor 70 and a hang-up switch 71, the series combination of which is connected between the leads 43a and 43b. The 3-pin output of the timer 48 is connected to a diode 72.

With power thus applied to the timer 48, the charging capacitor 64 begins to charge through the resistor 63 and initially triggers the timer to provide an output signal through the diode 72 to the coil 73a of a relay 73 having its contactor 73b connected in series in the telephone line 39a. At the same time, that output signal actuates an indicator 74, such as a light, through a resistor 75, showing that the unit is on power.

With the switch 28 in its automatic position, the indicator 77 (for example, a light) is lighted through the resistor 78 and lead 79 to indicate that the speaker phone 33 is coupled to the telephone line, when the switch 28 is in its automatic position.

The hang-up switch 71 acts to reset the timer and release the relay contactor 73b by effectively connecting, when closed, the 4-pin of the timer 48 to ground.

When the interfacer device is in its automatic mode, with the switch 28 in its automatic position, the indicator 77 is on, and the optocoupler 60 is connected to the telephone lines 39a and 39b through the input leads 80 and 81. The lead 80 is connected to the 2-pin of the optocoupler 60 through a blocking capacitor 82 while the lead 81 is connected to the 1-pin of the optocoupler 60 through the resistor 83. A diode 84 is connected between the 1- and 2-input pins of the optocoupler 60 at the output sides of the resistor 83 and capacitor 82. When the telephone lines 39a and 39b are inactive, a DC voltage appears across them which is blocked by the capacitor 82 from triggering the optocoupler 60.

When an AC ringing voltage appears across the telephone lines 39a and 39b in the conventional manner, the diode 84 shunts the negative voltage away from the light emitting diode (LED) included in the optocoupler 60 and the capacitor 82 and the resistor 83 effectively limit the current through the LED.

The ringing voltage necessary to trigger the optocoupler 60 is approximated by the identity:

$$V_R = 796/f_R + 39.2 \tag{1}$$

where:
$V_R$ is the ringing voltage, and
$f_R$ is the frequency of the AC signal.

When the ringing voltage actuates the optocoupler 60, the charging capacitor 64 begins to discharge through the resistors 65 and 66 to the 5-pin of the optocoupler 60 and from its 4-pin to the grounded lead 43b through line 87. When the ringing ceases, the charging capacitor 64 begins to recharge through the resistor 63. The charge and discharge cycling thus causes a delay in actuation of the timer 48. The period of delay before the timer 48 is triggered is controlled by the variable resistor 69.

When the cycling discharge of the charging capacitor 64 causes it to reach a voltage level sufficiently low at the 2-pin to trigger the timer 48, the coil 73a of the relay is actuated and the indicator 74 is actuated. At the same time, the charging capacitor 67 begins to recharge through the resistors 68 and 69. Adjustment of the variable resistor for the embodiment shown will permit up to about 82 seconds to complete the conversation on the speaker phone 33, unless the timer 48 is reset by actuating the hang-up switch as previously described.

If desired, the period of conversation may be extended indefinitely by actuating the extend switch 24 connected in series with the oppositely-poled diodes 90 and 91 between the lead 79 and the ground lead 43B. When closed, the switch 24 also actuates the indicator 92 connected through the resistor 93 to the junction between the switch 24 and the diode 90. When the extend switch 24 is actuated, the transformed power on the line 79 is provided directly to the coil 73a to hold the relay contactor 73b closed while bypassing the timer circuit. And, the extend switch is only operative to bypass the timer when the switch 28 is in its automatic position.

As thus described, the interfacer device according to the invention permits the following modes of operation when interfacing a conventional telephone network with a two-way speaker phone:

(1) Regular operation by the telephone network without connection of the speaker phone, when the selector switch is in its regular position.
(2) Automatic connection of a two speaker phone permitting hands-free communication through the speaker phone when the selector switch is in its automatic position to answer incoming calls.
(3) Termination of such calls at the end of an adjustable predetermined time.
(4) When in the automatic position, bypassing the timing circuit to permit extended conversation by closure of an extend switch.
(5) Manual cancellation of the timed conversation by actuation of a hang-up switch to reset the timing circuit.

The following components and values are capable of implementing the preferred embodiment of FIG. 3:

Resistor 83: 75K
Diode 84: 1N914
Capacitor 82: 0.1 μf, 200 V.
Optocoupler 60: 4N46 IC
Resistor 66: 5K
Resistor 65: 1K
Capacitor 64: 47 μf
Capacitor 67: 15 μf
Resistor 63: 75K
Resistor 68: 1K
Resistor 69: 5M
Timer 61: 555 ICC
Resistor 70: 1K
Diode 72: 1N4001
Diode 90: 1N4001
Diode 91: 1N4001
Resistor 93: 220Ω
Resistor 75: 220Ω
Resistor 78: 200Ω

Figure 4:
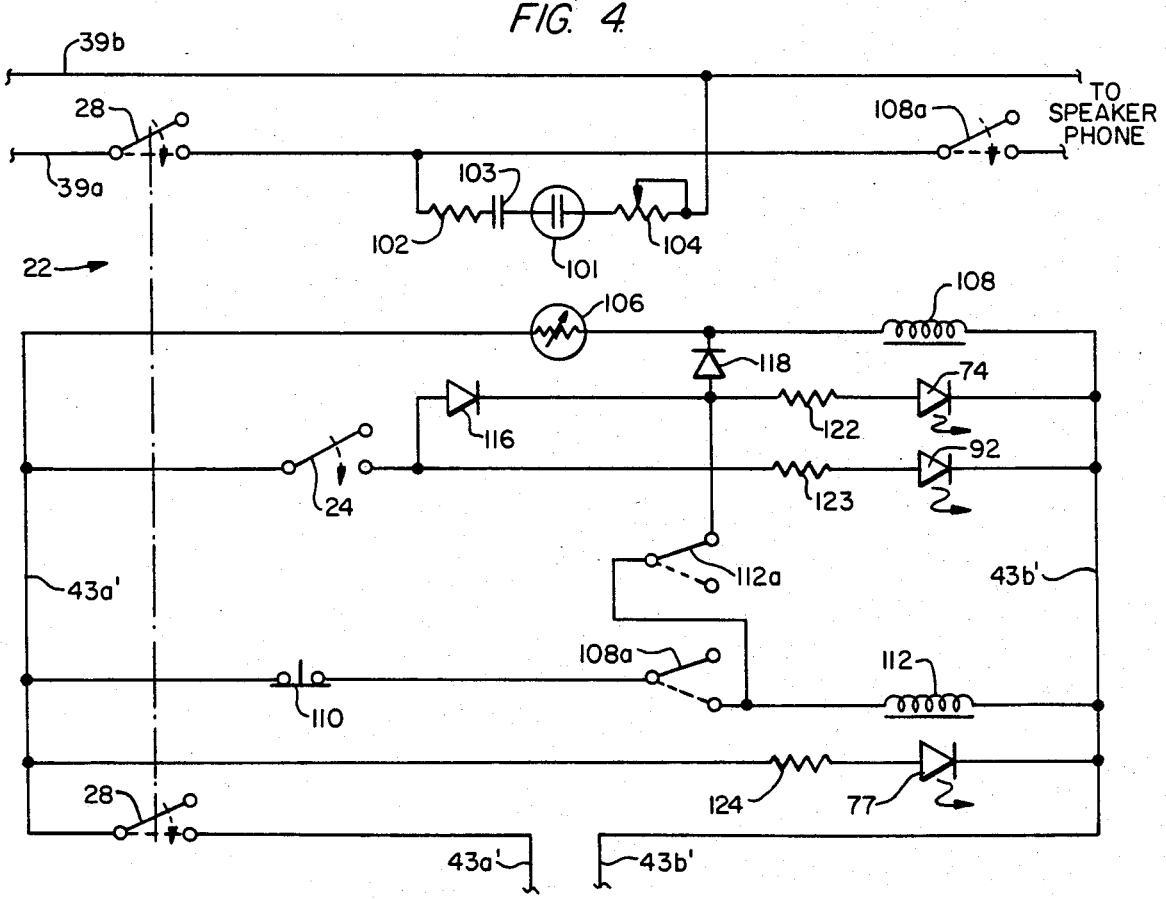
FIG. 4 is a detailed circuit diagram of an alternative, electromechanical embodiment of the invention.

FIG. 4 is an embodiment for practicing the invention by using electromechanical techniques. Where appropriate, like reference numerals have been included to identify like components.

In FIG. 4, a source of power is provided to input terminals 43a' and 43b' from a source such as a transformer 42 in FIGS. 1–3. A switch 28 includes a leg in circuit with the telephone lines 39b and 39a respectively as in FIG. 3. A series connected coupling circuit is provided between the telephone lines 39a and 39b for optically coupling a high brightness neon light 101 in circuit with a fixed resistor 102, a capacitor 103, and a variable resistor 104 to a photocell 106. With the unit in the automatic mode when the switch 28 is in its automatic position and the timer switch 24 is in its timed position, the light 77 is illuminated and the interfacer 22 is ready to accept the call.

As an incoming call generates an analog sequence on the telephone lines 39, the AC ringing voltage appears which is fed to the neon lamp 101 through the series circuit shown. The light produced by the neon lamp 101 is aimed at and optically coupled with the photocell 106 having a resistance which is inversely proportional to the amount of light present. The potentiometer 104 is used to vary the charge and discharge time of the capacitor 103, thus to vary the period of lighting of the neon light 106 for each ring.

As the resistance of the photocell 106 decreases, the current flowing through a photocell relay 108 connected in series therewith between the leads 43a' and 43b' increases. When the threshold of operation of the photocell relay 108 is reached, its contacts 108a pull in, latching itself to couple the speaker phone to the telephone lines. It can be seen that the contactor 108a is in an operative circuit with the photocell relay coil 108 in circuit with the telephone line 39a as well as with the hang-up switch 110 and the timed delay relay coil 112. At the time that the contact 108a is closed, power is supplied to the indicator 77 and the timed delay 112 now begins its timing cycle.

After a predetermined period of a time, contacts on the contactor 112a controlled by the time delay relay 112 open according to the timed potentiometer in the timed relay 112. After the timing period, power is removed from the photocell relay and the unit returns to the automatic mode. If desired, the timing period may be shortened by depressing the hang-up switch 110 and it is also possible to extend the length of the conversation indefinitely by placing the switch 24 in the extend position. When so positioned, power is supplied to the photocell relay through the diodes 116 and 118 to thus actuate the indicator 92.

Components suitable for practicing this embodiment are as follows:
  Neon lamp 101: NE51H
  Resistor 102: 33K
  Capacitor 103: 1 μf, 200 V.
  Resistor 104: 10K
  Didode 116: IN4001
  Diode 118: IN4001
  Resistor 122: 470Ω
  Resistor 123: 470Ω
  Resistor 124: 470Ω

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. An interfacing apparatus for electronically interfacing a two-way speaker device with a telephone network having telephone lines, including a source of power for said interfacing apparatus and mode selective switch means for selectively connecting, when actuated, said interfacing apparatus with said telephone network to permit either conventional telephone answering or hands-free automatic answering by the user, said electronic interfacing apparatus comprising:

an answering switch in circuit with said telephone lines which, when actuated by said interfacing apparatus, connects said telephone lines to said two-way speaker device to receive said incoming call;

coupling means for automatically coupling said telephone network to said speaker device in response to ringing signals on said telephone lines to receive incoming telephone calls on said speaker device, when said mode selective switch means is actuated, said coupling means including an electronic optocoupler having its input connected to a telephone line for receiving a signal indicative of an incoming call, and providing an output signal indicative of said incoming call, said output signal causing said telephone line to be connected to said speaker device by actuating said answering switch to permit hands-free two-way communication by a user with a caller;

timing means for limiting the duration of the coupling of said telephone network to said speaker device to a predetermined time, said timing means including an integrated electrical timing circuit having its input in circuit with a charging capacitor and the output of said coupling means, said timing circuit being responsive to a predetermined voltage level on said charging capacitor to connect said telephone line to said speaker device, wherein said charging capacitor is in circuit with said source of power and is charged thereby, said coupling means cyclically causing the discharge of said charging capacitor, in response to a ringing signal indicative of the presence of an incoming call, to a sufficiently low level of charge on said capacitor causing said timing circuit to be actuated to connect said incoming call to said speaker device;

resetting means including hang-up switch means for shortening the duration of the coupling of said telephone network to said speaker device by said actuation of said hang-up switch means; and extending means for bypassing said timing means to extend the duration of coupling when said extending means is actuated while said mode selective switch means is actuated.

2. The apparatus as set forth in claim 1 wherein said resetting means includes a resetting switch connected to the input of said timing means for cancelling the time duration of said coupling when said resetting switch is actuated.

3. The apparatus as set forth in claim 1 wherein said extending means includes an extend switch in circuit with said power source when said mode selective switch means is actuated to directly connect said incoming call to said speaker device while bypassing the operation of the timing circuit.

4. An electronic apparatus for interfacing a telephone network having at least a pair of telephone lines with a two-way speakerphone comprising:

switching means for optically coupling said speakerphone through an automatic answering device, said answering device comprising:

blocking means for blocking DC components of a predetermined polarity of signals on said telephone lines;

an electronic optocoupler for coupling said telephone ringing signals to ground for discharging a charging capacitor at a predetermined signal level, said optocoupler having its input connected to a telephone line for receiving a signal indicative of an incoming call and providing an output signal indicative thereof, said optocoupler cyclically discharging said charging capacitor in response to said output signal of said optocoupler; and means responsive to the predetermined signal level in said charging capacitor for connecting said speakerphone to said telephone lines automatically in a hands-free manner in response to said ringing signal.

5. An apparatus for electronically interfacing a two-way speaker device with a telephone network, including a source of power for said interfacing apparatus and mode selective switch means for selectively connecting, when actuated, said interfacing apparatus with said telephone network, said interfacing apparatus comprising:

coupling means, including an electronic optocoupler, for automatically coupling said telephone network to said speaker device to receive incoming telephone calls on said speaker device, when said mode selective switch means is actuated;

timing means for limiting the duration of the coupling of said telephone network to said speaker device to a predetermined time, wherein said timing means includes an integrated electrical timing circuit having its input in circuit with a charging capacitor and the output of said optocoupler, said timing circuit being responsive to a predetermined voltage level on said charging capacitor to connect said telephone line to said speaker device;

resetting means including hang-up switch means for resetting the predetermined time cycle on said timing means upon actuation of said hang-up switch; and extending means for bypassing said timing means to extend the duration of coupling when said extending means is actuated while said switch means is actuated, and wherein said optocoupler has its input connected to a telephone line for receiving a signal indicative of an incoming call, and provides an output signal indicative of said incoming call, said output signal causing said telephone line to be connected to said speaker device to permit hands-free two-way communication by a user with a caller, and wherein said charging capacitor is in circuit with said source of power and is charged thereby, said optocoupler cyclically causing the discharge of said charging capacitor in response to a ringing signal indicative of the presence of an incoming call, to a sufficiently low level of charge on said capacitor causing said timing circuit to be actuated to connect said incoming call to said speaker device.

* * * * *